United States Patent Office 3,644,439
Patented Feb. 22, 1972

3,644,439
3-HYDROXY- AND 3-ETHER-1,3,5(10),7-DEHYDROSTEROIDS
Gordon Hanley Phillipps, Greenford, Middlesex, England, assignor to Glaxo Laboratories, Limited, Greenford, England
No Drawing. Continuation-in-part of application Ser. No. 559,066, June 21, 1966. This application Mar. 4, 1969, Ser. No. 804,280
Int. Cl. C07c 169/20
U.S. Cl. 260—397.4          19 Claims

ABSTRACT OF THE DISCLOSURE

The process comprises the general steps of reacting a 2,5(10),7-dehydrosteroid-3-ether with a halogenating agent and subsequently dehydrohalogenating the reaction product to yield a 3-hydroxy- or 3-ether-1,3,5(10),7-dehydrosteroid. Conveniently the initial reaction is carried out in a basic medium. The compounds according to the invention comprise 17α-ethynyl-3-methoxyoestra-2,5(10), 7 - trien-17-β-ol 17α-ethynyl-3-methoxyoestra-1,3,5(10),7-tetraen-17β-ol and its 17-acetate, 17α-chloroethynyl-3-methoxyoestra-1,3,5(10),7-tetraen-17β-ol and 3 - cyclopentyloxy-17α-ethynyloestra-1,3,5(10),7-tetraen-17β-ol.

---

This application is a continuation-in-part of our application No. 559,066 filed June 21, 1966, and now abandoned.

This invention concerns a novel process for the production of equilin and related compounds.

The aromatic steroid equilin has been shown to possess oestrogenic activity. It is desirable to have available a synthetic method for the production of this compound from more readily available steroids and, in addition a process lending itself to the introduction of different substituents is required to permit pharmacological research into related compounds.

In my copending U.S. application No. 559,074 filed June 21, 1966, I have described the conversion of the aromatic steroid equilenin and related steroids into 2,5(10),7-dehydrosteroid 3-ethers. It is an object of the present invention to provide a process for the conversion of such products into equilin and related 3-hydroxy-1,3, 5(10),7-dehydrosteroids and their ethers which are useful as oestrogens.

According to the present invention I provide a process for the production of 3-hydroxy-1,3,5(10),7-dehydrosteroids and their 3-ethers in which a 2,5(10),7-dehydrosteroid-3-ether is reacted with a brominating or chlorinating agent to produce a brominated or chlorinated product which is then dehydrohalogenated to yield the required 3-hydroxy-1,3,5(10),7-dehydrosteroid or its 3-ethers.

The halogenating agent may, for example, be elemental bromine or, more conveniently, a cyclic or acyclic N-chloro- or N-bromo-amide, -imide or -hydantoin, for example N-chloro- or N-bromo-acetamide, N,N-dibromodimethylhydantoin or, for preference, N-chloro- or N-bromosuccinimide. These reagents are preferably reacted in aqueous media, for example aqueous tertiary alkanols such a t-butanol or aqueous cyclic ethers such as dioxan or tetrahydrofuran. In such systems the 3-ether is normally cleaved during the reaction to a 3-hydroxy steroid such as equilin itself. If a 3-ether substituent is required in the end product, re-etherification may be effected by conventional methods such as reaction with an appropriate halide or p-toluene sulphonate of the etherifying radical.

It is possible, however, to carry out the reaction in the presence of a mild base, for example an alkali metal acetate or bicarbonate and this is useful to avoid cleavage of the 3-ether group in the starting materials before attack by the brominating agent or attack at acid sensitive groupings such as the 17-hydroxy group.

Tetrahydropyranyl ethers may be prepared by reacting the 3-hydroxy compound with dihydropyran in an inert solvent such as benzene, toluene etc. in the presence of an acid catalyst, e.g. phosphorus oxychloride.

Further particularly useful systems for the halogenation/dehydrohalogenation reaction are polyhalides of quaternary ammonium halides and polyhalides of hydrohalide salts of tertiary amines, especially of hetero-aromatic amines; these reagents are used in a basic reaction medium. The term halides as used in this context refers, of course, only to chlorides and bromides. Polyhalides, that is polychlorides and polybromides, are halides comprising complexed halogen atoms in addition to the halogen atoms involved in salt formation; polybromides are sometimes referred to as "perbromides." The quaternary ammonium halides may, for example, carry separate hydrocarbon groups as in tetraalkylammonium bromides or chlorides or trialkylarylammonium bromides or chlorides, or they may comprise heterocyclic nitrogen atoms as in quarternary salts of pyridine formed with alkyl halides. The tertiary amine hydrohalides include for example pyridine and quinoline hydrohalides.

Particular examples of such polyhalides, include pyridine hydrobromide perbromide, quinoline hydrobromide perbromide, pyridine hydrochloride dichloride, tetramethylammonium bromide dibromide and trimethylphenylammonium bromide dibromide.

The preferred reagents are pyridine hydrobromide perbromide, which is in fact the dibromide of pyridine hydrobromide, and tetramethylammonium bromide dibromide.

The basic medium is preferably a basic organic liquid and conveniently one used as excess of a tertiary organic amine, for example one of those which may be present as its perhalide salt in the halogenating agent. An inert solvent may, however, also be present, for example an ether, e.g. a cyclic ether such as tetrahydrofuran or dioxan. Under the basic conditions in a system of this kind, the 3-ether group is not normally cleaved.

In general dehydrobromination takes place spontaneously in the above reactions.

The steroids used as starting material may carry varying substituents in the C and D rings and, for example may possess a 17-oxo group, a protected 17-oxo group such as a ketal group, or a 17-hydroxy or 17-acyloxy group or a 17-acyl, 17-acetoxyacetyl, 17-aliphatic or 17-araliphatic group in the presence or absence of a 17-hydroxy or 17-acyloxy group. The 17-acyloxy group may, for example, be a lower aliphatic acyloxy group having 1–5 carbon atoms e.g. a propionyloxy or acetoxy group. The 17-aliphatic group may be saturated or unsaturated and may carry one or more substituents for example halogen atoms. Examples of particularly useful groups include ethynyl, chloroethynyl and methyl groups.

The ether group at the 3-position may, for example be a lower alkoxy group, e.g. having up to 5 carbon atoms, a cycloalkoxy group, an aralkoxy group or a heterocyclic ether group. Where the required product is a 3-hydroxy steroid it may be preferable to use an especially readily removable 3-ether group such as the tetrahydropyranyl ether group referred to above.

In a preferred method for the synthesis of equilin itself, an equilenin-3-ether is converted to the corresponding 2,5(10),7-dehydrosteroid 3-ether by reduction. During this reaction the 17-oxo group is reduced to a hydroxyl group. Since equilin has a 17-oxo group, reoxidation is necessary and it is preferred to effect this before the halogenation/dehydrohalogenation reaction. Suitable oxidising agents include, in particular, Oppenauer reagents i.e. alkoxides in the presence of ketones, for example aluminium isopropoxide and cyclohexanone. Alternatively, it is possible to protect the 17-keto group before the reduction, for example by conversion to a ketal, e.g. the ethylene ketal, and the protecting group can conveniently remain during the halogenation/dehydrohalogenation reaction before removal, e.g. by hydrolysis.

Particularly useful compounds include—

17α-ethynyl-3-methoxyoestra-2,5(10),7-trien-17-β-ol;
17α-ethynyl - 3 - methoxyoestra-1,3,5(10),7-tetraen-17β-ol;
17α-ethynyl-3-methoxyoestra-1,3,5(10),7-tetraen-17β-ol 17-acetate;
17α-chloroethynyl-3-methoxyoestra-1,3,5(10),7-tetraen-17-β-ol; and
3-cyclopentyloxy-17α-ethynyloestra-1,3,5(10),7-tetraen-17β-ol.

These compounds constitute a further feature of the invention. They have shown particularly marked oral and subcutaneous oestrogenic activity and are thus especially useful in contraceptive formulations. 17α-ethynyl-3-methoxy-oestra-1,3,5(10),7-tetraen-17β-ol and, in particular its 17-acetate, have shown considerably greater oral antifertility activity than ethynyloestradiol (which is commonly used commercially in oral contraceptives) in rat mating tests.

The compounds may be formulated as oral contraceptives for continuous or intermittent administration, preferably in conjunction with a progestagen. The daily dose level is preferably between 0.1 and 2.0 mg. per day in a single dose, advantageously together with progestagen at a level of about 0.5–2 mg. depending on activity. Implantation pellets and other prolonged-release formulations may also be used.

In order that the invention may be well understood, we give the following examples by way of illustration only; all temperatures are in ° C.:

EXAMPLE 1

3-methoxyoestra-1,3,5(10),7-tetraen-17β-ol (dihydroequilin methyl ether)

3-methoxyoestra-2,5(10),7-trien-17β-ol (2.92 g.) in pyridine (100 ml.) was stirred at 0° and treated with pyridine hydrobromide perbromide (3.5 g.). After 5 min. at 0° the suspension was allowed to stand at room temperature for 4 hr. and was then poured into water (1.5 l.) and acidified to pH 3 with 2 N-hydrochloric acid. The product was extracted with a mixture of ether and ethyl acetate and the extract was washed to neutrality with water. Removal of solvent from the dried extract in vacuo left a residue (2.80 g.) which was recrystallised from ether to give 3-methoxyoestra-1,3,5(10),7-tetraen-17β-ol (1.07 g.), M.P. 140–142°. [α]$_D$+208.5° (c., 1.0 in dioxan), λ max. (in EtOH) 279 mµ (ε 1755), 287 mµ (ε 1720). Found (percent): C, 79.9; H, 8.8. Calcd. for $C_{19}H_{24}O_2$ (percent): C, 80.2; H, 8.5.)

EXAMPLE 2

3-methoxyoestra-2,5(10),7-trien-17-one 3-methoxyoestra-2,5(10),7-trien-17β-ol (1.0 g.) in sulphur-free toluene (33.3 ml.) and cyclohexanone (8.5 ml.) was treated with aluminium isopropoxide (1.04 g.) and the mixture was boiled under reflux in an atmosphere of nitrogen for 5.25 hr. The cooled suspension was shaken with water (25 ml.) for 15 min. and most of the toluene was distilled in vacuo. The suspension of product and alumina was extracted with ether, and the ethereal extract was washed with water and dried (MgSO₄). Removal of solvent from the extract in vacuo, finally at 100°/0.1 mm., left a crystalline residue of the 17-ketone (1.03 g.). This was recrystallised from ether to give a pure sample of 3 - methoxyoestra-2,5(10),7-trien-17-one (0.452 g.), M.P. 125–132°, [α]$_D$ +250° (c., 0.87 in CHCl₃). Found (percent): C, 80.5; H, 8.3. $C_{19}H_{24}O_2$ requires (percent): C, 80.2; H, 8.5.)

EXAMPLE 3

3-hydroxyoestra-1,3,5(10),7-tetraen-17-one (equilin)

3 - methoxyoestra - 2,5(10),7 - trien - 17 - one (152 mg.) in t-butanol (20 ml.) and water (8 ml.) was stirred at 0° in the dark and treated with N-bromosuccinimide (96 mg.). After 5 min. at 0° the solution was allowed to reach room temperature, and after 5 hr. it was concentrated in vacuo, diluted with water and extracted with ether. The extract was washed with water, dried (MgSO₄), and evaporated to dryness in vacuo to leave a crystalline residue (160 mg.). This was recrystallised from ethyl acetate to give equilin (62 mg.), M.P. 228–235° (Kofler), [α]$_D$ +289° (c., 0.7 in CHCl₃), λ max. 280–282 mµ (ε 2,210), with infrared and proton magnetic resonance spectra resembling those of an authentic sample.

EXAMPLE 4

3-methoxyoestra-1,3,5(10),7-tetraen-17-one (equilin methyl ether)

A stirred solution of 3-methoxyoestra-2,5(10),7-trien-17-one (150 mg.) in pyridine (5 mml.) at 0° was treated with pyridine hydrobromide perbromide (174 mg.) and after 5 min. at 0° the reaction mixture was kept at room temperature for 4 hr. The suspension was added to water and acidified to pH 4 with 2 N-hydrochloric acid. The oily product was extracted into ether and the extract was washed to neutrality, dried (MgSO₄), and evaporated to dryness in vacuo to leave an oil (137 mg.). This crystallised from ethyl acetate to give equilin methyl ether, M.P. 163–166°, λ max. 278–289 mµ (ε 1,929), with infrared and proton magnetic resonance spectra resembling those of an authentic sample.

EXAMPLE 5

3-methoxyoestra-1,3,5(10),7-tetraen-17-one 17-ethylene ketal

Pyridine hydrobromide perbromide (214 mg.) was added to a solution of 3-methoxyoestra-2,5(10),7-trien-17-one 17-ethylene ketal (219 mg.) in pyridine (10 ml.). The reaction mixture was stirred for 4 hr. at room temperature, poured into water, and just acidified with hydrochloric acid. The product was extracted into ether and crystallised from ether-hexane to give 3-methoxyoestra-1,3,5(10),7-tetraen-17-one 17-ethylene ketal (159 mg.), λ max. (in EtOH) 277–279 mµ (ε 1570).

EXAMPLE 6

The preparation of 17α - ethynyl - 3 - methoxyoestra-1,3,5(10),7 - tetraen - 17β - ol from 3-methoxyoestra-2,5(10),7-trien-17β-ol (a) 3-methoxyoestra-2,5(10),7-trien-17-one.—A mixture of 3-methoxyoestra-2,5(10),7-trien-17β-ol (10.17 g.), dry toluene (530 ml.), cyclohexanone (85 ml.), and aluminium isopropoxide (10 g.) was boiled under reflux in an atmosphere of nitrogen for 5 hours. Water was added to the cooled mixture which was then filtered through kieselguhr. The filtrate was steam distilled until all the cyclohexanone had been removed and the steroid was extracted from the residue with ether. The extracts were dried and concentrated to effect crystallisation and the product was recrystallised from ether to give 3-methoxyoestra-2,5(10),7-trien-17-one (6.96 g.) having M.P. 156–160°, [α]$_D$ +274° (in dioxan). (Found (percent): C, 80.45; H, 8.3. $C_{19}H_{24}O_2$ requires (percent): C, 80.25; H, 8.5.)

(b) 17α - ethynyl-3-methoxyoestra-2,5(10),7-trien-17β-ol.—A solution of 3-methoxyoestra-2,5(10),7-trien-17-one (4.94 g.) in benzene (50 ml.) and ether (100 ml.) was added to a suspension of sodium acetylide (from 2.4 g. sodium) in ammonia (400 ml.). The mixture was stirred under reflux for 24 hours and ammonium chloride (7.5 g.) was added. The ammonia was evaporated and water (200 ml.) was added. The organic phase was separated, washed, dried, and evaporated, and the residue was crystallised from methanol to yield 17α - ethynyl-3-methoxyoestra-2,5(10),7 - trien - 17β - ol (2.6 g.), M.P. 214–216°, [α]$_D$ +139° (in dioxan). (Found (percent): C, 81.1; H, 8.25. C$_{21}$H$_{26}$O$_2$ requires (percent): C, 81.25; H, 8.45.)

(c) 17α - ethynyl - 3 - methoxyoestra-1,3,5(10),7-tetraen - 17β - ol.—Pyridine hydrobromide perbromide (0.737 g.) was added to a solution of 17α-ethynyl-3-methoxyoestra - 2,5(10),7 - trien-17β-ol (0.685 g.) in pyridine (25 ml.) at 0°. The mixture was stirred at 0° for 10 minutes and then at room temperature for 3½ hours. The mixture was poured into water, acidified to pH 4 with hydrochloric acid and extracted with ether. The extracts were washed with aqueous sodium hydrogen carbonate and water, and were dried and evaporated. The residue was crystallised from methanol to give 17α-ethynyl - 3 - methoxyoestra - 1,3,5(10),7-tetraen-17β-ol (0.529 g.) having M.P. 181–183°, [α]$_D$ +112°, λ max. (in EtOH) 278.287 mμ (ε=1,900; 1,660). (Found (percent): C, 81.55; H, 8.1. C$_{21}$H$_{24}$O$_2$ requires (percent): C, 81.8; H, 7.85.)

EXAMPLE 7

3-methoxy-17α-methyloestra-1,3,5(10),7-tetraen-17β-ol

Pyridine hydrobromide perbromide (0.651 g.) was added at 0° to a solution of 3-methoxy-17α-methyloestra-2,5(10),7-trien-17β-ol (0.549 g.) in pyridine (20 ml.) and the mixture was stirred for 10 mins. and then at room temperature for 1 hour. The mixture was poured into water and acidified with hydrochloric acid. The steroid was extracted into ether and the washed and dried extracts were evaporated. The residue was crystallised from benzene/petrol (B.P. 40°–60°) to yield 3-methoxy-17α-methyl-oestra-1,3,5(10),7-tetraen-17β-ol (0.478 g.) having M.P. 129–134°, λ max. (in EtOH) 278,287 mμ (ε=1,800; 1,800). [α]$_D$ +146° (in dioxan) [Cohen et al. (J., 1935, 445) found M.P. 133–134°.]

EXAMPLE 8

The preparation of 17α-chloroethynyl-3-methoxyestra-1,3,5(10),7-tetraen - 17β - ol from 3-methoxyoestra-2,5(10),7-trien-17-one (a) 17α-chloroethynyl-3-methoxyoesra-2,5(10),7-trien-17β-ol cis-dichloroethylene (2.59 g.) in ether (15 ml.) was added a suspension of sodamide (from 1.23 g. sodium) in ammonia (400 ml.) and the mixture was stirred for 1 hour, 3-methoxyoestra-2,5(10),7 - triene - 17 - one (1.5 g.) dissolved in dimethoxyethane (100 ml.) was added and the mixture was stirred under reflux for 24 hours. Ammonium chloride (1.5 g.) was added and the ammonia was evaporated and water was added. The steroid was extracted into ether and the extracts were washed, dried, and evaporated. The crude product was purified by chromatography on alumina (grade 2) and crystallised from methanol to give 17α-chloroethylnyl - 3 - methoxyoestra-2,5(10),7-tien-17β-ol (0.986 g.) having M.P. 145–147°, [α]$_D$ +115° (in doxan). (Found (percent): C, 73.0; H, 7.3; Cl, 10.3. C$_{21}$H$_{25}$ClO$_2$ requires (percent): C, 73.15; H, 7.3; Cl, 10.3.)

(b) 17α-chloroethynyl - 3 - methoxyoestra-1,3,5(10),7-tetraen - 17β - ol.—Pyridine hydrobromide perbromide (2.497 g.) was added at 0° to a solution of 17α-chloroethynyl-3-methoxyoestra-2,5(10),7-trien-17β-ol (2.45 g.) in pyridine (80 ml.). The mixture was stirred at room temperature for 4 hours and then poured into water and acidified to pH 2 with hydrochloric acid. The steroid was extracted with ether and the extracts were washed with aqueous NaHCO$_3$, dried, and evaporated. The residue was crystallised from aqueous methanol to give 17α-chloroethynyl - 3 - methoxyoestra-1,3,5(10),7-tetraen - 17β - ol (2.08 g.). This was further purified by preparative thin layer chromatography and by crystallisation to yield the product having M.P. 95–97°, [α]$_D$ +78.5° (in dioxan) λ max. (in EtOH) 279, 287 mμ (ε=1950; 1880). (Found (percent): C, 73.5; H, 6.75; Cl, 10.05. C$_{21}$H$_{23}$ClO$_2$ requires (percent): C, 73.55; H, 6.75; Cl, 10.3.)

EXAMPLE 9

The preparation of equilin cyclopentyl ether from 3-cyclopentyloxyoestra-2,5(10),7-trien-17β-ol (a) 3 - cyclopentyloxyoestra-2,5(10),7-tien-17-one.—A mixture of 3-cyclopentyloxyoestra-2,5(10),7-trien-17β-ol (1.63 g.), dry toluene (50 ml., cyclohexanone (11 ml.) and aluminum isopropoxide (1 g.) was boiled under reflux in an atmosphere of nitrogen for 6 hours. Water was added to the cooled mixture which was then filtered through kieselguhr. The filtrate was steam distilled to remove organic solvents and the residue was extracted with ether. The extracts were washed, dried and concentrated to effect crystallisation. The 3-cyclopentyloxyoestra-2,5(10),7-trien-17-one (0.914 g.) was filtered off. It had M.P. 176–182°, [α]$_D$ +232° (in dioxan). (Found (percent): C, 81.9; H, 8.9. C$_{27}$H$_{30}$O$_2$ requires (percent): C, 81.6; H, 8.95.)

(b) Equilin 3-cyclopentyl ether.—Pyridine hydrobromide perbromide (0.759 g.) was added at 0° to a solution of 3-cyclopentyloxyoestra12,5(10),7-trien-17-one (0.64 g.) in pyridine (23 ml.). The mixture was stirred at room temperature for 4 hours, poured into water, and acidified with hydrochloric acid. The product was extracted with ether and the extracts were washed with aqueous NaHCO$_3$, dried, and evaporated. The residue was crystallised from petrol (B.P. 40°–60°) to give equilin 3-cyclopentyl ether (0.507 g.), M.P. 182–185°, [α]$_D$ +235° (in dioxan), λ max. (in EtOH) 281, 289 mμ (ε=2090; 2050). (Found (percent): C, 82.1; H, 8.4. C$_{23}$H$_{26}$O$_2$ requires (percent): C, 82.1; H, 8.4.)

EXAMPLE 10

Preparation of 3 - cyclopentyloxy-17α-ethynyloestra-1,3,5 (10),7-tetraen - 17β - ol from 3-cyclopentyloxyoestra-2,5(10),7-trien-17-one (a) 3-cyclopentyloxy - 17α - ethynyloestra-2,5(10),7-trien-17β-ol.—A saturated solution of 3-cyclopentyloxy-oestra-2,5(10),7-trien-17-one (3.92 g.) in 1:1 ether/benzene was added to a suspension of sodium acetylide (from 1.4 g. sodium) in ammonia (500 ml.). The mixture was stirred under reflux for 3 days and ammonium chloride (3 g.) was added. The ammonia was evaporated, water was added, and the mixture was extracted with ethyl acetate. The extracts were washed, dried, and evaporated, and the residue was crystallised from aqueous methanol to give 3-cyclopentyloxy - 17α - ethynyloestra-2,5(10),7-trien-17β-ol (3.19 g.). A portion was further purified by preparative-layer chromatography followed by crystallisation from aqueous methanol and the product had M.P. 104–106.5°, [α]$_D$ +108° (in dioxan).

(b) 3-cyclopentyloxy - 17α - ethynyloestra-1,3,5(10),7-tetraen-17β-ol.—Pyridine hydrobromide perbromide (2.02 g.) was added at 0° to a solution of 3-cyclopentyloxy-17α-ethylnyloestra-2,5(10),7-triene-17β-ol (2.14 g.) in pyridine (40 ml.). The mixture was stirred at room temperature for 4 hours and then poured into water and acidified to pH 2 with hydrochloric acid. The steroid was extracted with ether and the extracts were washed, dried, and evaporated. The residue was crystallised from aqueous methanol to give 3 - cyclopentyloxy-17α-ethynyloestra-1,3,5 (10),7-tetraen-17β-ol (1.76 g.) having [α]$_D$ +81° (in dioxan) λ max. (in EtOH), 280, 289 mμ (ε=2030; 1880).

EXAMPLE 11

The preparation of equilin methyl ether from 3-methoxyoestra-2,5(10),7-trien-17-one (a) Equilin 3-methyl ether 17-ethylene ketal.—Pyridine hydrobromide perbromide (2.132 g.) was added at 0° to a solution of 3-methoxyoestra-2,5(10),7-trien-17-one 17-ethylene ketal (1.99 g.) in pyridine (40 ml.). The mixture was stirred at 0° for 10 minutes and then at room temperature for 4 hours. The solution was poured into water and acidified with hydrochloric acid. The steroid was extracted into ether and the extracts were washed with aqueous NaHCO$_3$, dried and evaporated. The residue was crystallised from ethanol to yield equilin 3-methyl ether 17-ethylene ketal (1.41 g.) having M.P. 138–143°, [α]$_D$ +149.5°. [G. C. Busby et al. (J. Med. Chem., 1964, 7, 751) found M.P. 148–150°, [α]$_D$ +145°].

(b) Equilin 3-methyl ether.—A mixture of equilin 3-methyl ether 17-ethylene ketal (0.67 g.), methanol (30 ml.), water (5 ml.), 30% hydrochloric acid (5 ml.) and tetrahydrofuran (10 ml.) was boiled under reflux for 15 mins. in an atmosphere of nitrogen. The mixture was poured into sodium hydrogen carbonate solution and the organic solvents were removed under reduced pressure. The steroid was extracted into ether and the solution was washed and dried. Pure equilin methyl ether (0.46 g.) was obtained by crystallisation from ether and had M.P. 160–162°, [α]$_D$ +290° (in dioxan). [Cohen et al. (J., 1935, 445) found M.P. 160.5–161.5°.]

EXAMPLE 12

3-methoxyoestra-1,3,5(10),7-tetraen-17β-ol 3-methoxyoestra-2,5(10),7-trien-17β-ol (250 mg.) was dissolved in pyridine and cooled to 0° and tetramethylammonium tribromide (274 mg.) was added under nitrogen. The reaction was stirred at ca. 0° for 5 min. and then allowed to warm up to room temperature; it was stirred under nitrogen in the dark for 5 hrs.

The solution was acidified to ca. pH 4 with dilute hydrochloric acid and extracted with ether. The extract was concentrated in vacuo and the residual gum was treated with petroleum ether (40°–60°) to give 3-methoxyoestra-1,3,5(10),7-tetraen-17β-ol (200 mg.), [α]$_D$ +191° (c., 0.9 in dioxan), λ max. (in EtOH) 280 mμ, $E_{1\,cm.}^{1\%}$ 70

Its infrared and proton magnetic resonance spectra and behaviour on thin layer chromatography resembled those of an authentic sample.

EXAMPLE 13

Oestra-1,3,5(10),7-tetraen-3,17β-diol 3-methoxyoestra-2,5(10),7-trien-17β-ol (250 mg.) was dissolved in t-butanol (33 ml.); sodium acetate trihydrate (120 mg.) in water (13 ml.) was added and the solution was cooled to 8°. N-bromosuccinimide (156 mg.) was added and the solution was stirred under nitrogen in the dark for 4 hrs. The reaction mixture was concentrated in vacuo and diluted with water. The product was extracted into ether. Removal of the ether left a gum which was triturated with 40°–60° petroleum ether to give oestra-1,3,5(10),7-tetraen-3,17β-diol as a buff coloured solid (198 mg.), [α]$_D$ +185° (c., 0.8 in EtOH), λ max. (in EtOH) 281 mμ, $E_{1\,cm.}^{1\%}$ 115

Its infrared and proton magnetic resonance spectra and behaviour on thin layer chromatography resembled those of an authentic sample.

EXAMPLE 14

Oestra-1,3,5(10),7-tetraen-3,17β-diol 3-methoxyoestra-2,5(10),7-trien-17β-ol (250 mg.) was dissolved in t-butanol (33 ml.) Sodium acetate trihydrate (120 mg.) in water (13 ml.) was added and the solution was cooled to 14°. 1,3-dibromo-5,5-dimethylhydantoin (125 mg.) was added and the solution stirred under nitrogen in the dark for 3½ hrs. Isolation as in the preceding example gave crude oestra-1,3,5(10),7-tetraen-3,17β-diol (240 mg.), [α]$_D$ +188° (c., 1.0 in EtOH), λ max. (in EtOH) 280 mμ, $E_{1\,cm.}^{1\%}$ 110

EXAMPLE 15

Oestra-1,3,5(10),7-tetraen-3,17β-diol 3-methoxyoestra-2,5(10),7-trien-17β-ol (250 mg.) was dissolved in t-butanol (33 ml.), sodium hydrogen carbonate (160 mg.) in water (13 ml.) was added and the solution was cooled to 14°. N-bromosuccinimide (156 mg.) was added and the solution was stirred under nitrogen in the dark for 2 hrs. at room temperature. Isolation as in the preceding example gave crude oestra-1,3,5 (10),7-tetraen-3,17β-diol (220 mg.), [α]$_D$ +194° (c., 0.8 in EtOH), λ max. (in EtOH) 281 mμ, $E_{1\,cm.}^{1\%}$ 85

EXAMPLE 16

17α-ethynyloestra-1,3,5(10),7-tetraen-3,17β-diol

N-bromosuccinimide (144 mg.) was added to a cooled (0°) solution of 17α-ethynyl-3-methoxyoestra-2,5(10),7-trien-17β-ol (250 mg.) in t-butanol (33 ml.) and water (13 ml.) containing sodium hydrogen carbonate (160 mg.). The mixture was stirred under nitrogen in the dark at room temperature for 4 hours and then poured into water. The steroid was extracted into ether and the extract was washed and dried. The solution was concentrated to dryness in vacuo and the residue was crystallised from aqueous methanol to give 17α-ethynyloestra-1,3,5(10),7-tetraen-3,17β-diol (146 mg.), M.P. 125–137°, [α]$_D$ +112° (in dioxan) λ max. (in EtOH) 282, 296 mμ (ε 2200, 2070).

EXAMPLE 17

Equilin methyl ether from equilin methyl ether 17-ethylene ketal

A mixture of equilin methyl ether 17-ethylene ketal (.670 g.), methanol (30 ml.), tetrahydrofuran (10 ml.), water (5 ml.) and 30% aqueous hydrochloric acid (5 ml.) was boiled under reflux in an atmosphere of nitrogen for 15 minutes. The solution was neutralised with aqueous sodium hydrogen carbonate and the organic solvents were distilled off under reduced pressure. The steroid was extracted into ether and the dried extract was concentrated to effect crystallisation of equilin methyl ether (0.458 g.), M.P. 160–162°, [α]$_D$ +290° (in dioxan), λ max. (in EtOH) 280, 288 mμ (ε, 2,360; 2,160).

EXAMPLE 18

17β-acetoxy-17 α-ethynyl-3-methoxyoestra-1,3,5(10),7-tetraene

17α - ethynyl-3-methoxyoestra-1,3,3(10),7-tetraen-17β-ol (1 g.) was dissolved in acetic acid (20 ml.) and acetic anhydride (10 ml.) under nitrogen, p-toluene sulphonic acid (500 mg.) was added and the solution was allowed to stand at room temperature for 2¼ hrs. The reaction mixture was poured into aqueous sodium hydrogen carbonate and the steroid was extracted with ether. Crystallisation from aqueous methanol gave 17β-acetoxy-17α-ethynyl-3-methoxyoestra-1, 3,5(10),7-tetraene (600 mg.), M.P. 102–104°, [α]$_D$ +96° (c., 0.5 in dioxan).

I claim:
1. A process for the production of a compound selected from the group consisting of a 3-hydroxy-1,3,5(10), 7-dehydrosteroid and a 3-ether-1,3,5(10),7-dehydrosteroid which comprises:
   (a) reacting a 2,5(10),7-dehydrosteroid 3-ether with a halogenating agent of a halogen selected from the group consisting of bromine and chlorine, and
   (b) after reaction of said halogenating agent with said dehydrosteroid, dehydrohalogenating to form said compound.

2. A process according to claim 1 wherein said halogenating agent is selected from the group consisting of elemental bromine, elemental chlorine, a cyclic-N-chloro-amide compound, an acyclic-N-chloro-amide compound, a cyclic-N-bromo-amide compound, an acyclic-N-bromo-amide compound, a cyclic-N-chloro-imide, an acyclic-N-chloro-imide, a cyclic-N-bromo-imide, an acyclic-N-bromo-imide, an N-chloro substituted hydantoin, an N-bromo-substituted hydantoin, a polychloride of a quaternary ammonium chloride, a polybromide of a quaternary ammonium bromide, a polychloride of a hydrochloride salt of a tertiary amine, a polybromide of a hydrobromide salt of a tertiary amine.

3. A process according to claim 2 wherein the compound selected from the group consisting of polychlorides and polybromides of quaternary ammonium chlorides and bromides and of hydrochloride and hydrobromide salts of tertiary amines is used as halogenating agent, the reaction being effected in a basic reaction medium.

4. A process according to claim 2 wherein the halogenating agent is selected from the group consisting of N-chloroacetamide, N-bromoacetamide, N-chlorosuccinimide, N-bromosuccinimide and N,N-dibromodimethylhydantoin.

5. A process according to claim 4 wherein the reaction between the dehydrosteroid and the halogenating agent is effected in an aqueous medium.

6. A process according to claim 5 wherein the aqueous medium additionally comprises at least one compound selected from the group consisting of a tertiary alcohol, dioxane, and tetrahydrofuran.

7. A process according to claim 2 wherein the halogenating agent is a quaternary ammonium compound and is selected from the group consisting of a polychloride of a tetra-alkylammonium chloride, a polybromide of a tetra-alkylammonium bromide, a polychloride of a trialkylarylammonium chloride, a polybromide of a trialkylarylammonium bromide.

8. A process according to claim 7 wherein the halogenating agent is selected from the group consisting of tetramethylammonium bromide dibromide and trimethylphenylammonium bromide dibromide.

9. A process according to claim 2 wherein the halogenating agent is a tertiary amine compound and is selected from the group consisting of a polychloride of a hetero-cyclic tertiary amine, hydrochloride or a polybromide of a heterocyclic tertiary amine hydrobromide.

10. A process according to claim 9 wherein the halogenating agent is selected from the group consisting of pyridine hydrobromide perbromide, quinoline hydrobromide perbromide and pyridine hydrochloride dichloride.

11. A process according to claim 3 wherein the basic medium comprises a basic organic liquid.

12. A process according to claim 9 wherein the said tertiary amine is used in excess to provide a basic reaction medium.

13. A process according to claim 1 wherein the 3-ether dehydrosteroid which is reacted with the halogenating agent in step (a) is converted to a 3-hydroxy compound of said dehydrosteroid and said 3-hydroxy compound is reacted with an etherifying agent to produce the 3-ether-1,3,5(10),7-dehydrosteroid.

14. A process according to claim 1 wherein the 2,5(10),7-dehydrosteroid-3-ether which is reacted in step (a) possesses at its 17-position a member selected from the group consisting of an oxo group, a protected oxo group, a hydroxyl group, an acyloxy group, an acyl group, an acetoxyacyl group, an aliphatic group and an araliphatic group.

15. A process according to claim 14 wherein the ether group at 3-position is selected from the group consisting of a lower alkoxy group, a cycloalkoxy group, an aralkoxy group and a monocyclic oxygen containing heterocyclic ether group.

16. A process according to claim 15 wherein the ether group in the 3-position is selected from the group consisting of an alkoxy group of from 1 to 5 carbon atoms, a cyclopentyloxy group and a tetrahydropyranyloxy group.

17. A process according to claim 1 wherein the dehydrosteroid which is reacted in step (a) is a 17-oxo-2,5(10),7-dehydrosteroid-3-ether prepared by the oxidation of the corresponding 17β-hydroxy compound with an Oppenauer reagent to form the oxo group from the hydroxy group.

18. A process according to claim 5 in which an alkali metal acetate or bicarbonate is included in the aqueous medium.

19. The compound 17α-ethynyl - 3 - methoxyoestra-2,5(10),7-trien-17-β-ol.

References Cited
UNITED STATES PATENTS 3,409,643 11/1968 Shapiro et al. _____ 260—397.5
3,520,881 7/1970 Cross et al. _____ 260—239.55

ELBERT L. ROBERTS, Primary Examiner

U.S. Cl. X.R.

260—239.55 C, 397.5

PO-1050
(5/69)

UNITED STATES PATENT OFFICE
CERTIFICATE OF CORRECTION

Patent No. 3,644,439                     Dated February 22, 1972

Inventor(s) Gordon Hanley Phillipps

It is certified that error appears in the above-identified patent and that said Letters Patent are hereby corrected as shown below:

Column 1, between lines 9 and 10, there should appear --claims priority, application Great Britain, June 22, 1965, No. 26389/65--.

Signed and sealed this 29th day of August 1972.

(SEAL)
Attest:

EDWARD M. FLETCHER, JR.
Attesting Officer

ROBERT GOTTSCHALK
Commissioner of Patents